United States Patent [19]
Ogura et al.

[11] Patent Number: 5,442,605
[45] Date of Patent: Aug. 15, 1995

[54] HEAD DRIVING DEVICE WITH CARRIAGE ASSEMBLY CENTROID POSITION SET WHERE SERVO FREQUENCY IS NOT DELAYED

[75] Inventors: Manabu Ogura; Hidemitsu Fujisawa, both of Hyogo

[73] Assignee: Mitsubishi Denki Kabushiki Kaisha, Tokyo, Japan

[21] Appl. No.: 322,723

[22] Filed: Oct. 4, 1994

Related U.S. Application Data

[63] Continuation of Ser. No. 73,490, Jun. 9, 1993, abandoned.

[30] Foreign Application Priority Data

Jun. 30, 1992 [JP] Japan .................. 4-172341

[51] Int. Cl.6 ............................................. G11B 21/02
[52] U.S. Cl. .................. 369/44.14; 369/220; 369/244; 360/106
[58] Field of Search ............ 369/44.11, 44.14, 249, 369/244, 219, 220; 360/106, 107, 109

[56] References Cited

U.S. PATENT DOCUMENTS 5,016,238  5/1991  Shtipelman et al. ............ 369/249 X
5,033,037  7/1991  Yanagi ........................ 369/44.35 X
5,130,873  7/1992  Yumura et al. ................. 360/106

FOREIGN PATENT DOCUMENTS 58-161176  9/1983  Japan .
63-27945   6/1988  Japan .

Primary Examiner—W. R. Young
Assistant Examiner—Duncan Wilkinson
Attorney, Agent, or Firm—Burns, Doane, Swecker & Mathis

[57] ABSTRACT

In a head driving device having an optical head for erasing, recording and reproducing information, a carriage adapted to move in a radial direction of a disk as an information recording carrier together with the optical head, and voice coils attached to the carriage and imparting a thrust to the carriage in cooperation with a magnetic circuit, wherein tracking for a disk track deflection is performed by only a linear actuator comprising the magnetic circuit and the voice coils, a working center line of forces applied to the voice coils is set as so as to extend on the disk side with respect to the center of gravity of the moving portion. By so doing, a tracking servo system does not become unstable even when the working center line of forces exerted on the voice coils and the center of gravity of the moving portion are deviated from each other.

4 Claims, 6 Drawing Sheets

HEAD DRIVING DEVICE WITH CARRIAGE ASSEMBLY CENTROID POSITION SET WHERE SERVO FREQUENCY IS NOT DELAYED

This application is a continuation, of application Ser. No. 08/073,490, filed Jun. 9, 1993 now abandoned.

BACKGROUND OF THE INVENTION

1. Field of the Invention

The present invention relates to a head driving device in a disk drive which records, reproduces and erases information using light or magnetism.

2. Description of the Prior Art

FIG. 1 is a schematic side view of a conventional optical disk unit. In this conventional optical disk unit, recording, reproducing and erasing of information are performed optically while a disk 1 is rotated at high speed by means of a motor 2 and an optical head 3 is moved radially of the disk. In order to ensure recording, reproducing and erasing of information at high speed and high density, it is necessary to use a head driving device of high speed and high accuracy and realize a highly stable servo system.

FIG. 2 is a sectional view of a conventional head driving device which is disclosed, for example, in Japanese Patent Publication No. 27945/88. An optical head 3 is carried on a carriage 4, and voice coils 5a and 5b are attached to both side faces of the carriage 4. The carriage 4 is provided with bearings 7a and 7b which engage linear guide rails 6a and 6, respectively, and guide the carriage radially of a disk 1.

The voice coils 5a and 5b are incorporated in a twin body type magnetic circuit for access which comprises linear motor yokes 8a, 8b and permanent magnets 9a, 9b. The linear motor yokes 8a (or 8b) are in the form of a loop having a plurality of parallel sides which are long in the moving direction of the carriage 4, with one side thereof being inserted in the voice coil 5a (or 5b). On the other side opposed to the outside face of the voice coil 5a (or 5b) is disposed a permanent magnet 9a (or 9b).

In the head driving device of such construction, when a predetermined electric current is allowed to flow through the voice coils 5a and 5b, a force acting in the radial direction of the disk 1 is applied to the carriage 4 due to the action of magnetic lines of force generated in the magnetic circuit, so that the carriage moves radially of the disk together with the optical head 3. In this case, if the device is designed in such a manner that a central working line of the forces exerted on the two voice coils 5a and 5b is at the same height as the center of gravity of the whole of a carriage assembly (a moving portion), a pitching vibration is not generated in the moving portion because there is not generated a turning moment around the center of gravity of the moving portion, so that a highly stable tracking servo system can be realized.

In such conventional head driving device, when thrust is applied to the voice coils, since a central working line of the forces exerted on the voice coils is deviated from the center of gravity of the moving portion, there is generated a turning moment around the centroid of the moving portion, so that there is excited a pitching resonance of a mass-spring system which is formed by both the inertia of the moving portion and the spring characteristics of the bearings.

As stated above, however, in the case where the position of the central working line of the forces applied to the voice coils relative to the centroid of the moving portion is deviated as in a head driving device according to a first aspect of the present invention, the tracking servo system does not become unstable in a pitching resonance portion which appears on open loop frequency characteristics of the whole of the tracking servo system because antiresonance and resonance appear in this order from the low frequency side, thus affording a phase leading direction. Further, since it is not necessary to make the alignment of the force working center line with the center of gravity of the moving portion strictly, the design and maintenance of parts are no longer complicated.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

However, in order to suppress the pitching vibration of the moving portion, it is necessary to perform fairly strictly the alignment between the central working line of the forces exerted on the voice coils 5a and 5b and the center of gravity of the moving portion, thus giving rise to the problem that the operation in designing an actual machine and the maintenance of high machining and assembling accuracy for the components which constitute the moving portion are complicated.

SUMMARY OF THE INVENTION

In view of the foregoing, it is an object of the present invention to provide a head driving device involving a tracking servo system which does not become unstable even when a working center line of forces exerted on voice coils and the center of gravity of the moving portion are deviated from each other.

According to the first aspect of the present invention, for achieving the above-mentioned object, there is provided a head driving device wherein tracking is performed by only a linear actuator comprising a magnetic circuit and voice coils, the device being constructed so that a working center line of forces exerted on the voice coils extends on the disk side with respect to the center of gravity of the moving portion.

According to the second aspect of the present invention, there is provided a head driving device wherein tracking is performed by the combination of a coarse movement made by a linear actuator comprising a magnetic circuit and voice coils and a fine movement made by a lens actuator or a galvanomirror, the device being constructed so that a working center line of forces exerted on the voice coils extend on the side opposite to a disk with respect to the moving portion.

DETAILED DESCRIPTION OF THE PREFERRED EMBODIMENTS

Preferred embodiments of the invention will now be described in detail referring to the accompanying drawings. The descriptions of the common component parts are omitted here to avoid unnecessary repetition.

Embodiment 1

Figure 1:
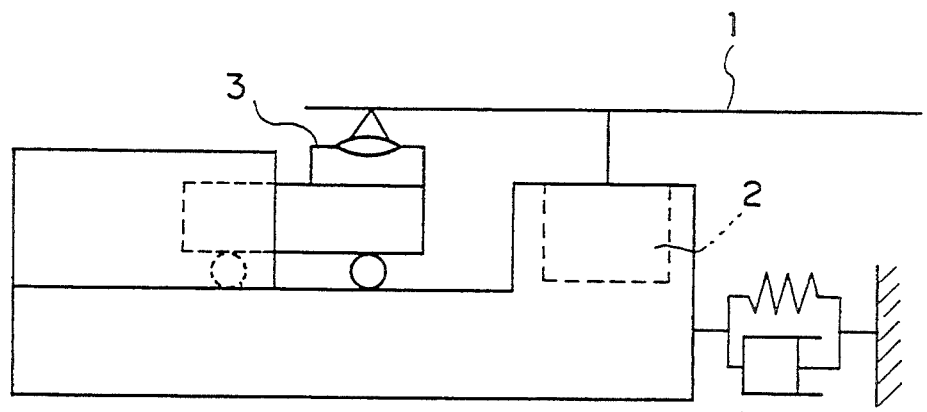
FIG. 1 is a sectional view schematically showing a general optical disk.
Figure 2:
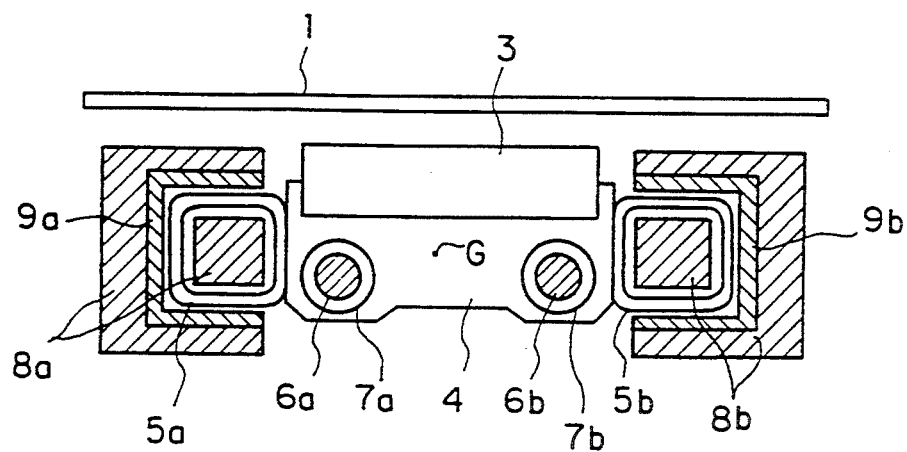
FIG. 2 is a sectional view showing a conventional head driving device.
Figure 3:
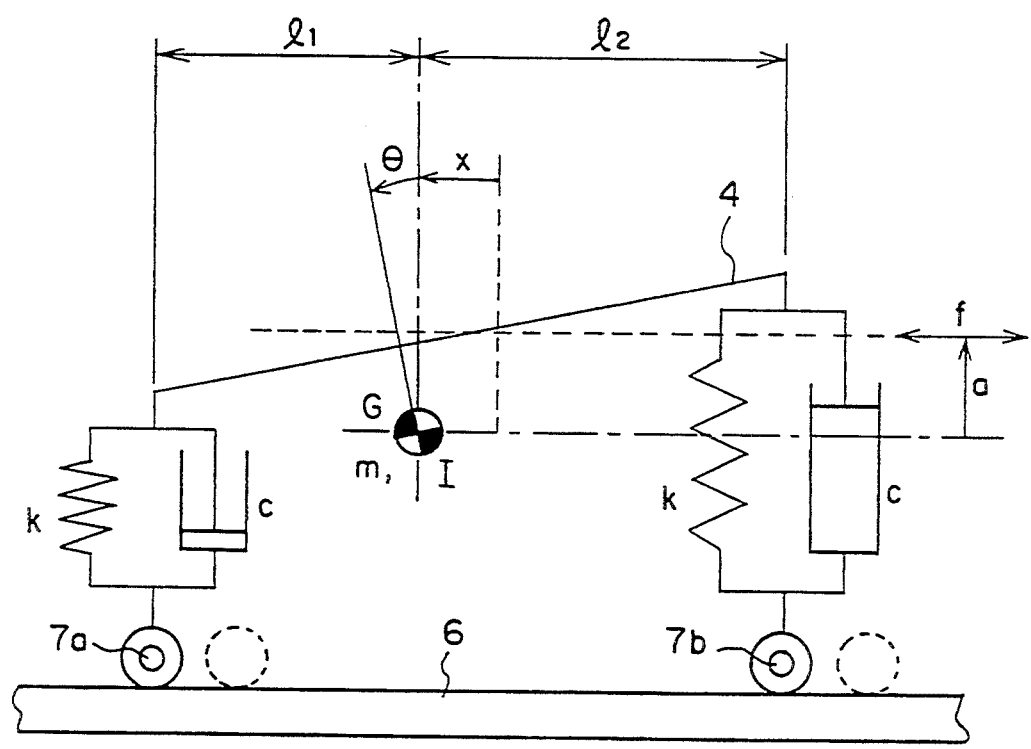
FIG. 3 is an explanatory construction diagram showing a mass-spring model with a degree of freedom of 2 for explaining a head driving device according to an embodiment of the present invention.

An embodiment of the present invention will now be described concretely with respect to an analysis model of a pitching vibration of the moving portion and numerical expressions obtained therefrom. FIG. 3 is a mass-spring model with a degree of freedom of 2, showing a pitching vibration of the moving portion. In FIG. 3, m denotes a mass of the moving portion; I denotes a moment of inertia around the center of gravity G of the moving portion; k denotes a bearing spring constant; c denotes a bearing damping coefficient; f denotes a linear motor drive force; $l_1$ denotes the distance from the center of gravity to a front bearing; $l_2$ denotes the distance from the center of gravity to a rear bearing; a denotes the distance from the center of gravity to a drive force working line; x denotes a translational displacement in the seek direction of the moving portion; and $\theta$ denotes a pitching angle displacement of the moving portion. The following is a motional equation of this system:

$$\begin{cases} mx = f \\ I\theta + (l_1^2 + l_2^2) c\theta + (l_1^2 + l_2^2) k\theta = af \end{cases} \quad (1)$$

Figure 4:
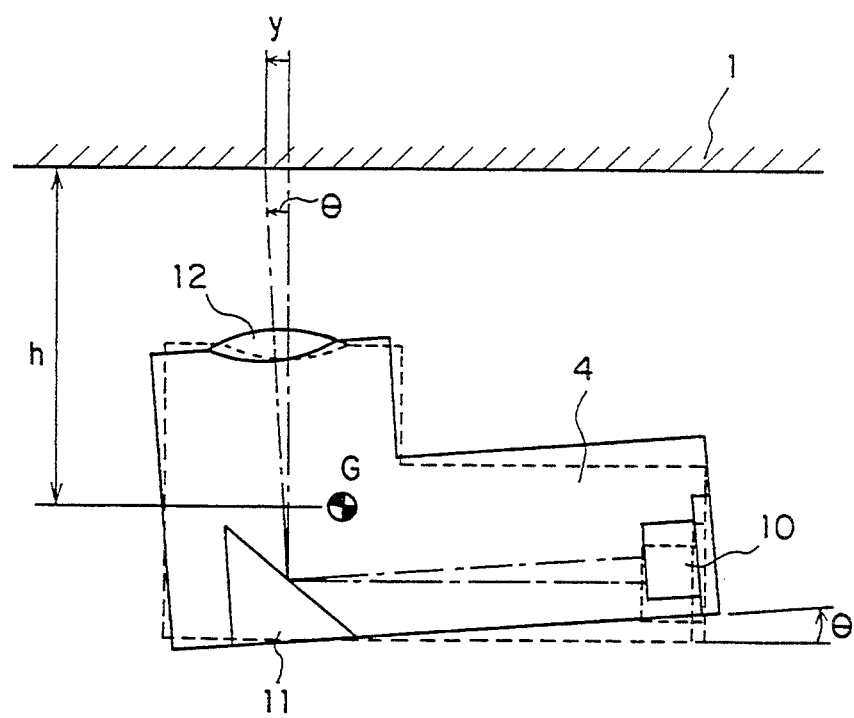
FIG. 4 is an explanatory construction diagram showing a deviation of light spot on a recording surface of a disk relative to a pitching angle displacement of the moving portion for explaining the head driving device embodying the invention.

FIG. 4 is a schematic diagram showing a deviation of light spot on a recording surface of a disk relative to a pitching angle displacement of the moving portion. In FIG. 4, h denotes the distance from the center of gravity of the moving portion to the medium recording surface; y represents a deviation of light spot on the medium recording surface caused by pitching of the moving portion; numeral 10 denotes a semiconductor laser; numeral 11 denotes a launch mirrors and numeral 12 denotes an objective lens. On the basis of FIG. 4 and the equation (1), a transfer function G(s) from a linear motor drive force f up to a displacement x+y in the tracking direction of light spot can be expressed as follows:

$$G(s) = \frac{K}{s^2} \cdot \frac{s^2 + 2\zeta_2\omega_2 s + \omega_2^2}{s^2 + 2\zeta_1\omega_1 s + \omega_1^2} \quad (2)$$

In the above equations (1) and (2), K, $\omega_1$, $\omega_2$, $\zeta_1$ and $\zeta_2$ are determined by the following numerical expressions:

$$K = \frac{I + ahm}{mI}, \omega_1 = 1\sqrt{\frac{K}{I}}, \omega_2 = 1\sqrt{\frac{k}{I + ahm}}$$

$$\zeta_1 = \frac{lc}{2\sqrt{kI}}, \zeta_2 = \frac{lc}{2\sqrt{k(I + ahm)}}$$

As is apparent from the foregoing equation (2), resonance and antiresonance appear in the frequency characteristics of the transfer function G(s), and when a>0, resonance frequency $\omega_1$ antiresonance frequency $\omega_2$, while when a<0, the result is the reverse.

Figure 5:
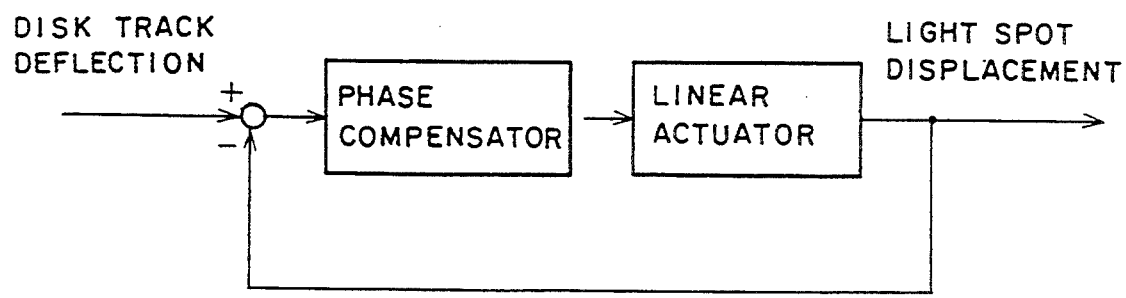
FIG. 5 is a block diagram showing a tracking servo system in a first embodiment of the invention.
Figure 6:
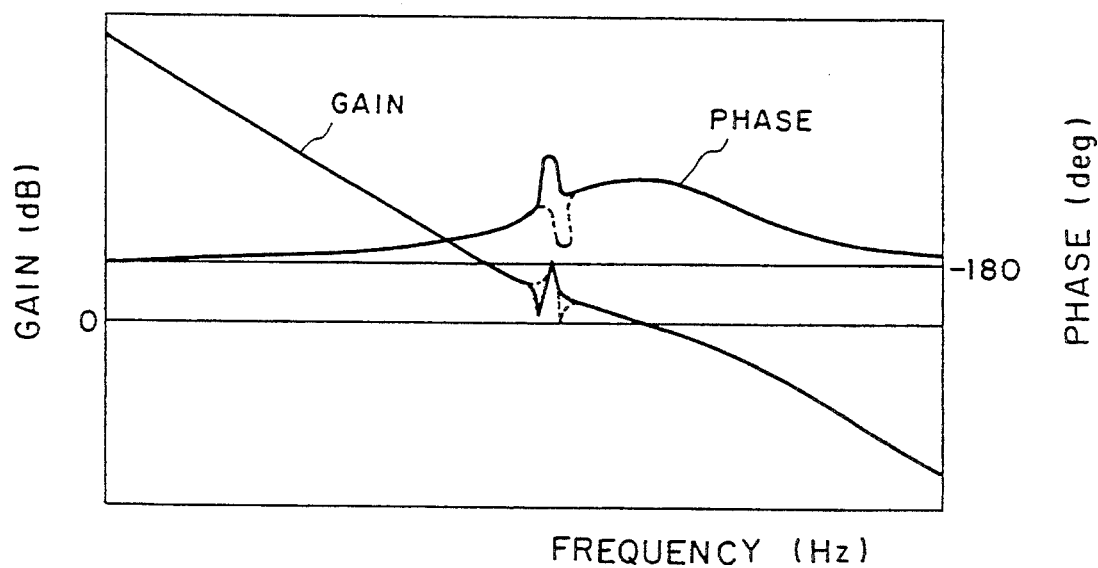
FIG. 6 is an open loop frequency characteristic diagram of the tracking servo system in the first embodiment.

FIG. 5 is a block diagram of a tracking servo system in a first embodiment of the present invention. In the case where characteristics of a linear actuator are expressed by equation (2), the servo system of FIG. 5 has such open loop frequency characteristics as shown in FIG. 6, and in a resonance portion induced by pitching, a solid line characteristic when a is larger than 0 is obtained and a broken line characteristic when a is smaller than 0 is obtained. In the case of a<0, the servo system assumes a phase lagging direction and so may become unstable, while in the case of a>0, the servo system assumes a phase leading direction and thus the stability thereof is ensured.

Therefore, in the head driving device wherein tracking for a disk tracking deflection is performed by only a linear actuator, the stability of the tracking servo system can be ensured by setting a driving force working line of the linear actuator so as to pass on the disk side with respect to a centroid position of the moving portion.

Embodiment 2

Figure 7:
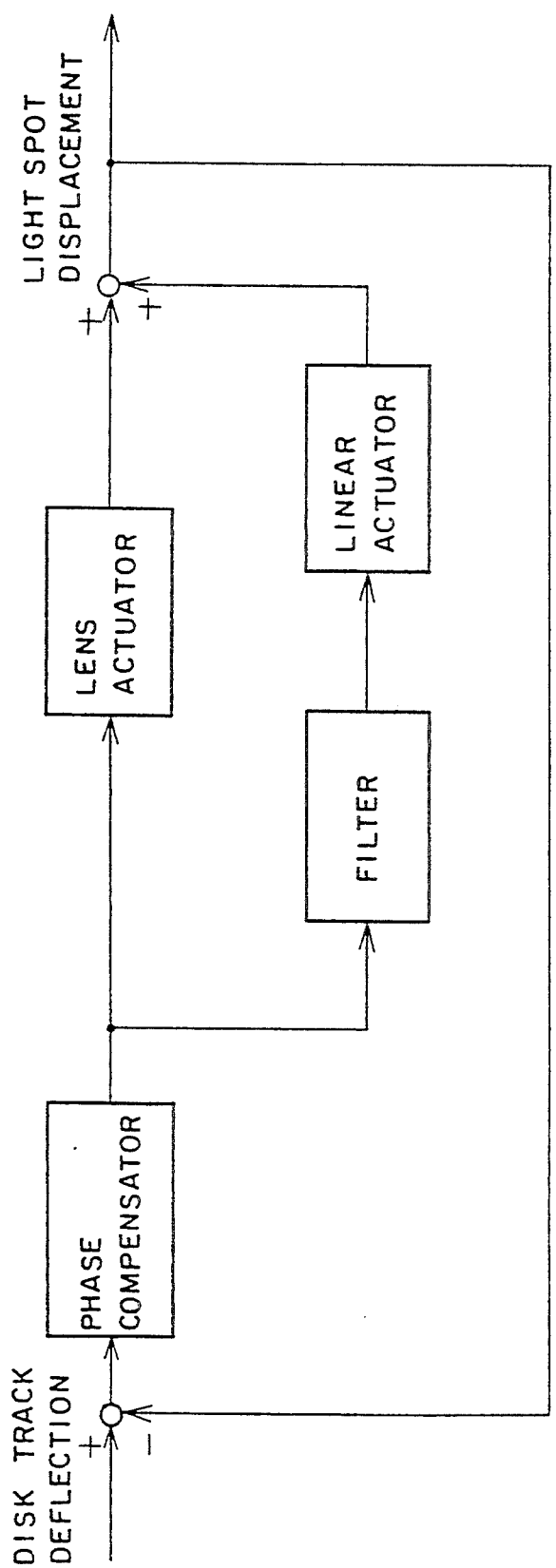
FIG. 7 is a block diagram showing a tracking servo system in a second embodiment of the invention.

FIG. 7 is a block diagram of a tracking servo system in a second embodiment of the present invention. This system employs a lens actuator for following up a track deflection of a small amplitude in addition to a linear actuator which follows up a track deflection of a large amplitude. The lens actuator system and the linear actuator system are band-separated from each other through a secondary low-pass filter. The low frequency side is taken charge of by the linear actuator system and the high frequency side by the lens actuator.

Figure 8:
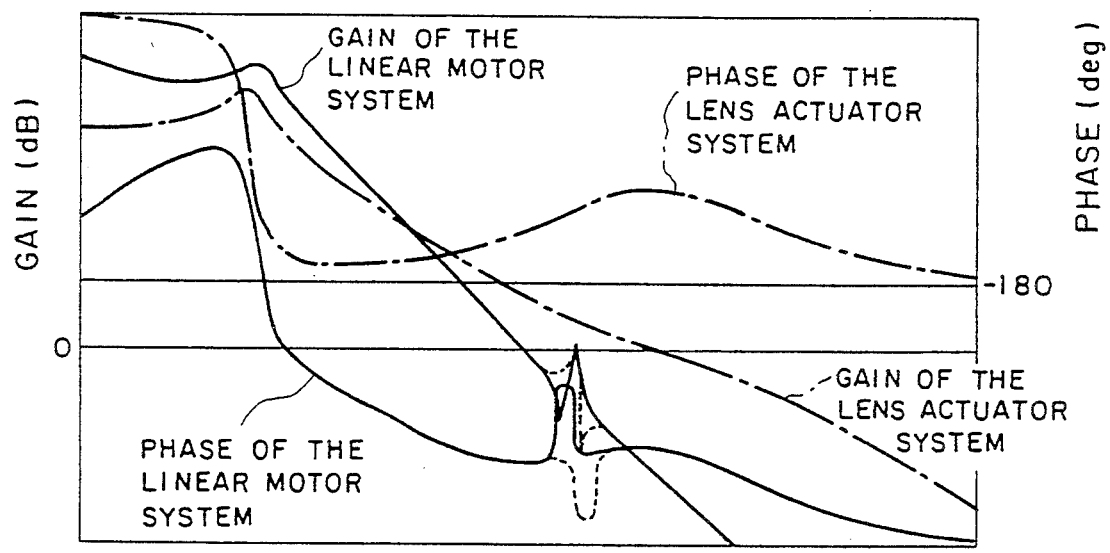
FIG. 8 is an open loop frequency characteristic diagram of a linear actuator system and a lens actuator system in the second embodiment.
Figure 9:
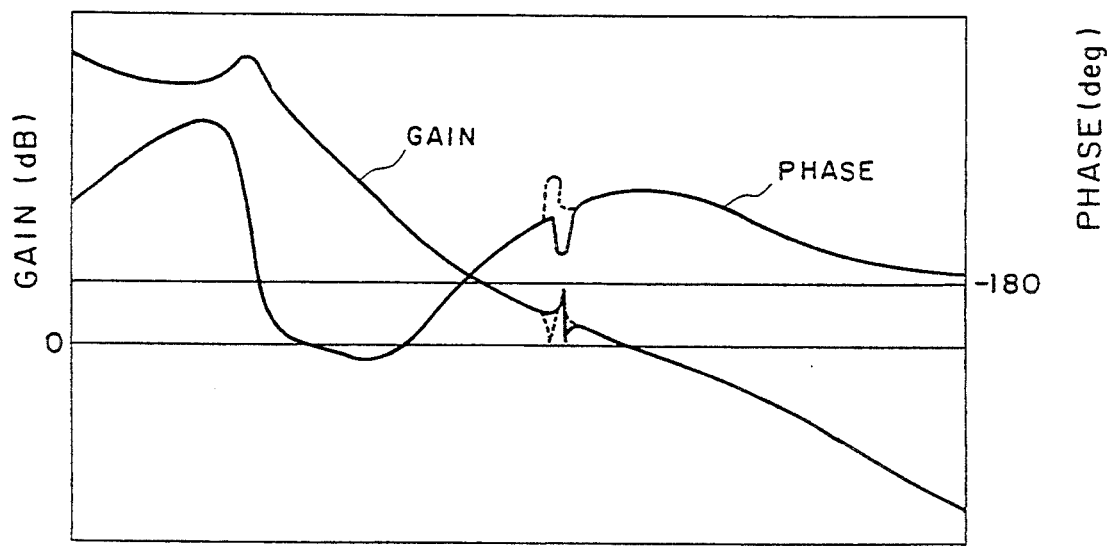
FIG. 9 is an open loop frequency characteristic diagram of the tracking servo system in the second embodiment.

In the case where the characteristic of the linear actuator is expressed by the equation (2), open loop frequency characteristics of the linear actuator system and the lens actuator system are as shown in FIG. 8. In the linear actuator system there appear resonance and antiresonance as in the first embodiment. In the frequency region in which there appears pitching resonance of the moving portion, there generally is presented a phase difference of 180° between the lens actuator system and the linear actuator system.

Consequently, in the open loop frequency characteristic of the entire tracking servo system which is expressed as the sum of the two, the relation of resonance <antiresonance appears as resonance>antiresonance and resonance>antiresonance appears as resonance<antiresonance. Therefore, in a head driving device wherein tracking is performed by both a coarse movement of a linear actuator and a fine movement of a lens actuator or a galvanomirror, the stability of the tracking servo system can be ensured by setting a drive force working line of the linear actuator so as to pass on the side opposite to a disk with respect to a centroid position of the moving portion.

According to the construction of the head driving device of the present invention, as set forth above, in a pitch resonance portion which appears on the open loop frequency characteristic of the entire tracking servo system, a working line of the linear motor drive force and the center of gravity of the moving portion are deviated from each other so that antiresonance and resonance appear in this order from the low frequency side, thus affording a phase leading direction, and hence the tracking servo system does not become unstable. Moreover, since it is not necessary to make the alignment of a force working center line with the center of gravity of the moving portion strictly, of designing and parts management are no longer troublesome.

What is claimed is:

1. In a head driving device having an optical head for erasing, recording and reproducing information optically, a carriage adapted to move in a radial direction of a disk as an information recording carrier together with said optical head, and voice coils attached to said carriage and imparting a thrust to the carriage in cooperation with a magnetic circuit, wherein tracking is performed by the combination of a coarse movement made by a linear actuator including a magnetic circuit and voice coil and a fine movement made by a lens actuator or a galvanomirror, the improvement in which a centroid position of the whole of a carriage assembly including said optical head, said carriage and said voice coils is located between a drive force working line of said linear actuator and said disk, wherein in a pitch resonance portion which appears on an open loop frequency characteristic of a tracking servo system of the head driving device, said drive force working line of the linear actuator and said centroid position of said carriage assembly are deviated from each other within a range in which a phase of said open loop frequency characteristic of the tracking servo system is not delayed.

2. Apparatus for use in conjunction with a disk having information optically recorded thereon, said apparatus comprising a carriage assembly which is moveable in a radial direction of said disk, said carriage assembly including a head for optically reading said information from said disk and a voice coil which coacts magnetically with a magnetic circuit to move said carriage assembly, said voice coil and said magnetic circuit together comprising a linear actuator, wherein tracking of a light spot on said disk is effected by a combination of coarse movement made by said linear actuator and fine movement made by means for effecting fine movement, the centroid of said carriage assembly being positioned between said disk and a drive force working line of said linear actuator, wherein in a pitch resonance portion which appears on a open loop frequency characteristic of a tracking servo system of the apparatus, said drive force working line of the linear actuator and said centroid position of said carriage assembly are deviated from each other within a range in which a phase of said open loop frequency characteristic of the tracking servo system is not delayed.

3. Apparatus as claimed in claim 2 wherein said means for effecting fine movement comprises a lens actuator.

4. Apparatus as claimed in claim 2 wherein said means for effecting fine movement comprises a galvanomirror.

* * * * *